Figure 1:
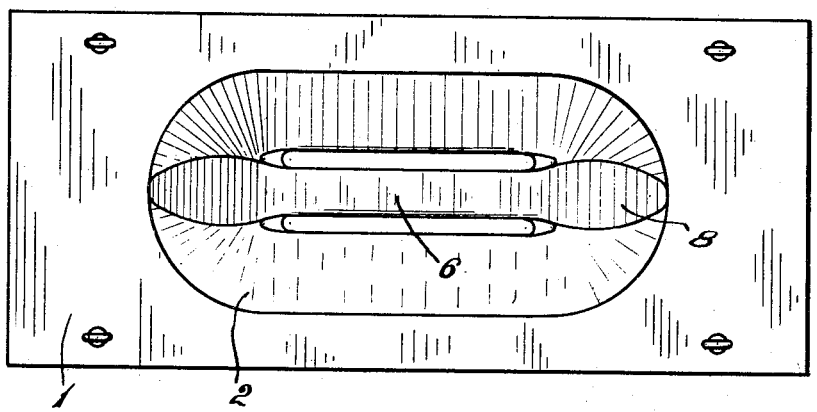

H. K. HITCHCOCK.
GLASS DRAWING APPARATUS.
APPLICATION FILED JAN. 2, 1918.

1,324,965.

Patented Dec. 16, 1919.
2 SHEETS—SHEET 1.

H. K. HITCHCOCK.
GLASS DRAWING APPARATUS.
APPLICATION FILED JAN. 2, 1918.

1,324,965.

Patented Dec. 16, 1919.
2 SHEETS—SHEET 2.

UNITED STATES PATENT OFFICE.

HALBERT K. HITCHCOCK, OF PITTSBURGH, PENNSYLVANIA, ASSIGNOR, BY MESNE ASSIGNMENTS, OF ONE-HALF TO HITCHCOCK EXPERIMENT COMPANY, A CORPORATION OF NEW JERSEY.

GLASS-DRAWING APPARATUS.

1,324,965.  Specification of Letters Patent.  Patented Dec. 16, 1919.

Application filed January 2, 1918. Serial No. 209,867.

*To all whom it may concern:*

Be it known that I, HALBERT K. HITCHCOCK, a citizen of the United States, residing at Pittsburgh, in the county of Allegheny and State of Pennsylvania, have invented certain new and useful Improvements in Glass-Drawing Apparatus, of which the following is a specification.

The invention relates to glass drawing apparatus, and particularly to sheet drawing apparatus. It has for its principal objects; the provision of an improved arrangement, (1) whereby a proper temperature of glass is secured at the point of drawing, (2) whereby the sheet being drawn is shielded from the radiant heat from beneath, while permitting of a proper supply of relatively hot fluid glass to take the place of that withdrawn, (3) whereby the temperature of the body of glass which lies immediately below the forming edge of the sheet may be regulated to suit conditions, (4) whereby the position of the sheet at the longitudinal center of the drawing slot is automatically maintained, and (5) whereby the width of the sheet is maintained substantially constant regardless of any relatively slight changes of position of the sheet in the drawing slot. Certain embodiments of the invention are illustrated in the accompanying drawings, wherein—

Figure 2:
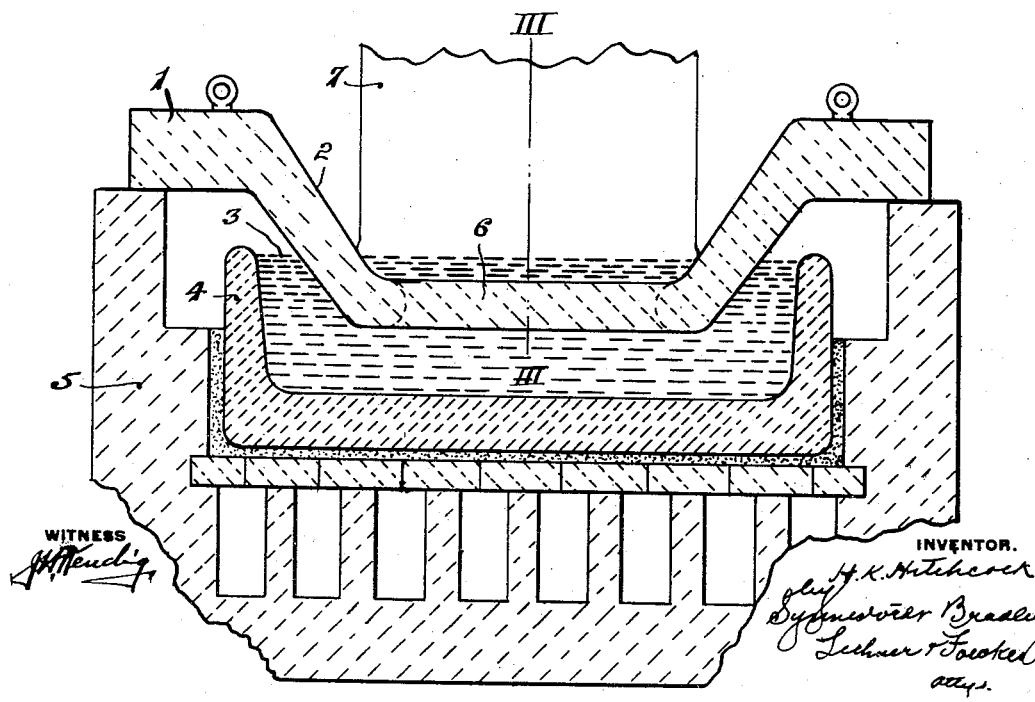
Figure 3:
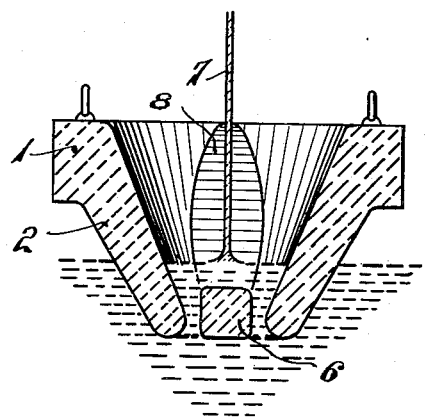
Figure 4:
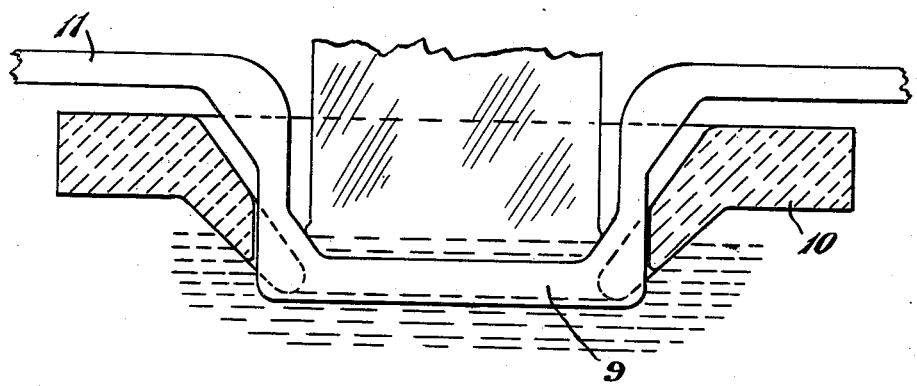

Figure 1 is a plan view of the refractory slot member to which the invention particularly relates; Fig. 2 is a vertical section taken through the slot member and a portion of the tank in which the slot member is positioned; Fig. 3 is a section through the slot member on the line III—III of Fig. 2; and Fig. 4 is a longitudinal section through a modified form of slot member in position of use.

The slot member 1 is made of refractory material, preferably in the form of an elongated basin having the downwardly and inwardly inclined walls 2 terminating beneath the surface of the glass and providing a drawing slot in free communication with the body of glass 3. This body of glass is carried by a refractory container 4 mounted in the brick-work 5, the form of the construction for carrying the molten bath of glass being immaterial in so far as the present invention is concerned.

As shown in Figs. 1 and 3, the drawing slot at the bottom of the basin is partially filled with a refractory strip or bar 6 extending from one end of the slot to the other. This strip is spaced below the surface of the glass a distance depending upon conditions, and the drawing of the sheet 7 occurs from the body of glass in the slot lying above the member 6.

The bar or strip 6 serves as a shield for the sheet 7 and the body of glass just above the bar, since it cuts off the radiant heat from the body of highly heated glass lying beneath the shield. As a result the glass from which the drawing occurs is cooler and more viscous than would be the case with a drawing slot not provided with a shield. The spaces at the sides of the shield are of sufficient area to permit a free flow of relatively fluid glass from the main body of glass outside the basin to the body of glass inside the basin so that glass of the proper temperature flows into the basin to replenish the supply which is reduced as the drawing of the sheet continues.

The use of the shield also tends to maintain the position of the sheet at the center line of the drawing block or basin, since the tendency of the line of generation is to maintain itself where the resistance to drawing is greatest, and this line is found above the center of the shield 6 where the glass has the lowest temperature and is most viscous. If the sheet moves laterally, the side of the sheet toward which movement occurs becomes exposed to more and more radiant heat from the slot on that side of the bar or shield, so that the glass on that side of the sheet becomes softer and the tension on such side less, while the condition is reversed on the other side of the sheet. On such other side, the movement is away from the slot on that side, so that the shielding effect of the bar is increased, the surface glass in the sheet becoming harder with a corresponding increase in tension. As a result of the decreased tension on one side and the increased tension of the other side, the line of generation is shifted back to its original position.

The use of the shield also permits the maintenance of the main body of glass at a higher temperature than would otherwise be the case and the maintenance of a relatively high temperature in the glass from which drawing occurs is recognized in the art as being of advantage, defects such as string, stone and rheam being less under this condition.

The ends of the slot member are preferably made flat, as indicated at 8, so that in case the position of the sheet is shifted slightly in a lateral direction, the width of the sheet is not varied as would be the case if the ends of the slot member were rounded following the usual contour of such member. The walls 2 of the slot member, in conjunction with the bar 6 serve to protect the sheet from all radiant heat from the main body of glass except that coming through the two slots at the sides of the bar.

Fig. 4 illustrates a modification designed to provide for the regulation of the vertical height of the shield member. This is accomplished by making the shield member 9 separate from the slot member 10, such member 9 working in a slot in the lower portion of the member 10. Suitable means may be employed for regulating the vertical height of the arms 11 so that the temperature conditions above the part 9 may be adjusted. The member 9 is preferably made of the same refractory material as the slot member 10.

The drawing operation is initiated by the use of a bait which is dipped in the glass and drawn upward in the usual way. Any suitable type of bait may be used and the further drawing accomplished by the use of rollers or any other suitable gripping devices and leer mechanism for taking care of the continuous formation of the sheet.

What I claim is:

1. In glass drawing apparatus employing a glass bath from which a sheet of glass is to be drawn, refractory means provided with a drawing slot, and a refractory shielding bar lying in the slot underneath the sheet which is drawn from the slot.

2. In glass drawing apparatus employing a glass bath from which a sheet of glass is to be drawn, refractory means provided with a drawing slot, and a refractory shielding bar below the surface of the glass extending longitudinally of the slot from one end thereof to the other.

3. In glass drawing apparatus employing a glass bath from which a sheet of glass is to be drawn, refractory means provided with a slot and having a downwardly and inwardly inclined inner surface extending beneath the surface of the glass, and an elongated refractory shielding member lying in the slot beneath the surface of the glass.

4. In glass drawing apparatus employing a glass bath from which a sheet of glass is to be drawn, a refractory drawing basin open at the bottom and with its lower edges extending below the surface of the glass bath, and a shielding strip of refractory material lying in said opening beneath the surface of the glass.

5. In glass drawing apparatus employing a glass bath from which a sheet of glass is to be drawn, a refractory drawing basin open at the bottom and having downwardly and inwardly inclined walls and with its lower edges extending below the surface of the glass bath, and a shielding strip of refractory material lying in said opening beneath the surface of the glass and extending from one edge thereof to the other.

6. In glass drawing apparatus employing a glass bath from which a sheet of glass is to be drawn, a refractory drawing basin open at the bottom and with its lower edges extending below the surface of the glass bath, and a shielding strip of refractory material lying in said opening beneath the surface of the glass, said strip being adjustable vertically.

7. In apparatus for drawing glass sheets from a bath of molten glass, a refractory drawing member constituting an elongated basin having its inner surface inclined inwardly and downwardly and lying partly above and partly below the surface of the molten glass, the end surfaces of the basin merging into the side surfaces on curves, but having at their central portions flat inclined surfaces, so that a limited lateral movement of the line of generation of the sheet does not alter the length of such line.

HALBERT K. HITCHCOCK.